Nov. 30, 1948.　　　　R. H. ROBINSON　　　　2,455,192
PREHEATING INSTALLATION IN BOILERS FOR
QUICK HEATING AND STEAMING

Filed July 27, 1942　　　　　　　　　　　　4 Sheets-Sheet 2

Nov. 30, 1948.   R. H. ROBINSON   2,455,192
PREHEATING INSTALLATION IN BOILERS FOR
QUICK HEATING AND STEAMING
Filed July 27, 1942   4 Sheets-Sheet 4

Patented Nov. 30, 1948

2,455,192

UNITED STATES PATENT OFFICE 2,455,192

PREHEATING INSTALLATION IN BOILERS
FOR QUICK HEATING AND STEAMING

Roy H. Robinson, Chicago, Ill.

Application July 27, 1942, Serial No. 452,482

8 Claims. (Cl. 122—68)

1

This invention relates to auxiliary heating elements in boilers and heating plants, disclosed in my co-pending application Serial No. 145,058, filed May 27, 1937, maturing August 4, 1942, into Patent No. 2,291,921, and to improved and varied methods of forming, fabricating and installing same.

One of the prime objects of my invention is to improve the efficiency of my pre-heating units which make possible the quick production and circulation of steam in a heating plant and particularly without waiting to raise the temperature of the main body of water in the boiler to the steaming point, resulting in saving of fuel, quicker and more satisfactory heating, and increase in the heating capacity and efficiency of the boiler.

A further and particular object of my invention is to minimize the labor and time required in the field in installing these pre-heating or pre-steaming units in boilers in operation by designing them in a novel and improved way so that they can be produced in assembled multiple batteries in the factory at greatly reduced cost and in mass and standardized production and the actual field work of installation, which is proportionately much more expensive than factory bench and assembly line work, reduced to a fraction of that heretofore required. In this way the shutting down of heating plants in operation while the pre-heating elements are installed, is similarly reduced to a fraction of the previous time required and that important obstacle overcome.

A further object of my invention is to provide novel means for forming my tubular elements to secure enhanced strength and durability as well as simple fabrication.

Still another object is to provide new means for overcoming the difficulties heretofore inherent to overhead welding.

These and many other objects and advantages of my invention will be better understood by referring to the following specification when considered in connection with the accompanying drawings illustrating certain embodiments thereof in which—

2

Fig. 4 is a front elevation of a pre-steaming battery unit, without cross fins 31, attached to the crown sheet of the fire box.

Fig. 5 is a side elevation of same, without railway unions 33b, 23c and 27a.

Fig. 6 is a fragmentary front elevation of a modified form of pre-steaming battery unit in position in the firebox in conjunction with the refractory intercepting wall.

Fig. 7 is a front elevation of a modified form of a pre-steaming battery unit attached to the crown sheet of the firebox.

Fig. 8 is a fragmentary elevation taken on the line 8—8 of Fig. 9 showing the welded connection of the battery tubular frame of Fig. 4 to the overhead crown sheet of the fire box.

Fig. 9 is a cross section of same taken on the line 9—9 of Fig. 8.

Fig. 10 is a cross section of the battery tubular frame connection of Fig. 7 taken on the line 10—10.

Fig. 18 is a front elevation of a modified form of pre-steaming battery unit attached to a crownsheet.

Figures 1, 3:
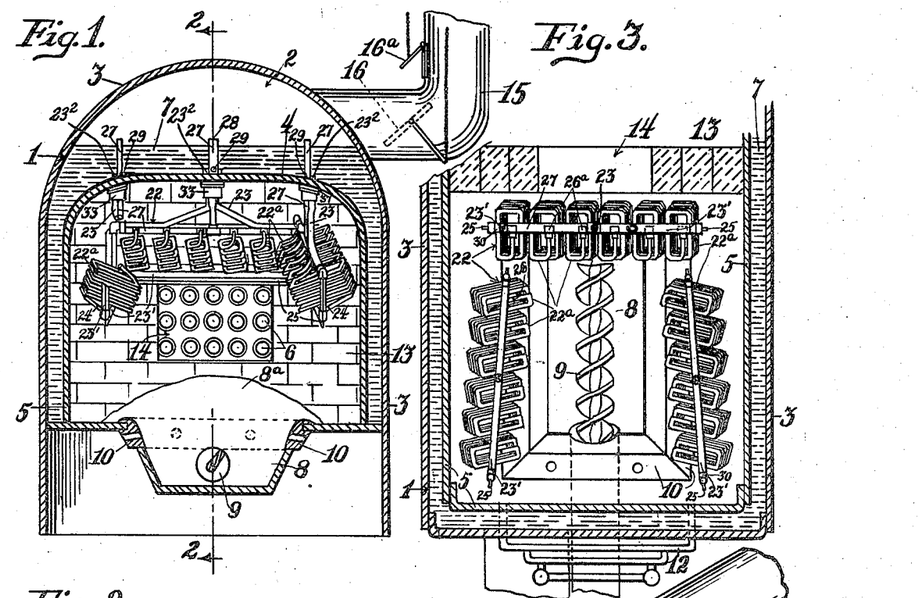
Fig. 1 is a transverse sectional elevation on the line 1—1 of Fig. 2 through the firebox of a typical boiler showing the installation of pre-steaming batteries.
Fig. 3 is a fragmentary plan of same showing the firebox.
Figures 2, 3A, 3B:
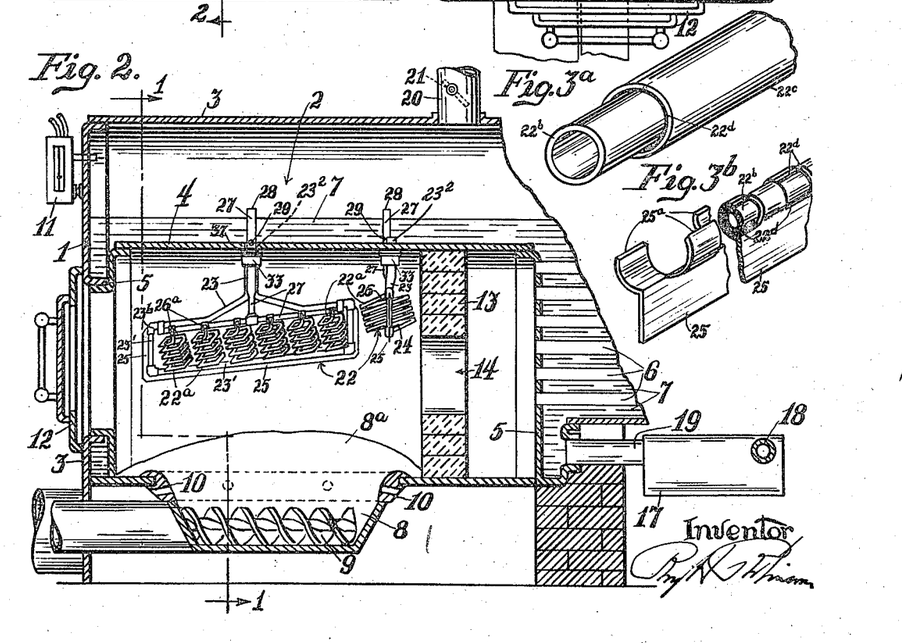
Fig. 2 is a fragmentary longitudinal sectional elevation of same on the line 2—2 of Fig. 1.
Fig. 3a is a fragmentary perspective of multi-walled tubing for coils or tubular frames, etc.
Fig. 3b is a fragmentary perspective of metal finning for tubular frames and coils.

Referring to the drawings in detail, Figs. 1 and 2 show cross sections of a typical boiler of the horizontal type in common use in heating plants for apartments and other buildings. The water and steam compartments 1 and 2, respectively, is formed by the outer steel shell 3 and the inner steel lining of the firebox formed by the crown sheet 4 and the side walls 5, connected at the back with the boiler tubes 6. The water 7 covers the crown sheet for a few inches as noted in the customary practice. The floor of the firebox is formed, in the case of hand firing, by a grate but in this instance I show an underfeed coal stoker now quite commonly installed for the modern operation of such heating plants. This has a fire pot 8 spaced away from the side walls 5 and centered on the longitudinal axis of the firebox. The coal 8a is fed into the firepot by a screw feed 9, and forced draft is delivered through the tuyères 10, the stoker being automatically operated in most instances and preferably by a pressurestat 11, which is set to stop the operation of the coal feed and forced air draft when the steam pressure reaches a point for which the pressurestat is set and to start same again when the pressure falls to another set point. The stoker can similarly be automatically operated by a thermostat or an aquastat, or time clock, or a combination of any or all of such or other automatic control devices. The firebox is entered through the customary firing door 12.

In order to obtain the greatest and increased efficiency I preferably introduce in the typical firebox, as already noted in my aforesaid copending application Serial No. 145,058 (Patent No. 2,291,921), my intercepting wall preferably formed of refractory heat retaining material such as firebrick. This wall 13, is located transversely of the firebox at its backward end between the fire pot of the stoker and the boiler tubes and so forms two compartments within the firebox. The wall 13 has an exit opening 14 spaced away from the water cooled side walls and crown sheet of the firebox and located on the central axis of the firebox.

The boiler stack 15 is preferably provided with a damper control 16 together with a fly opening control 16a. For greater efficiency, but not necessity, a vacuum pump 17 is added to draw the steam through the system through the piper 18, and the return water returns to the boiler through the pipe 19. The steam passes into the heating system through the outlet 20 and a check valve 21, if desired, is provided to control same and retain the steam in the heating lines during the rest periods in the steam generation.

Within the firebox, as noted, I introduced my pre-steaming batteries 22 formed of a plurality of quick heating elements 22a preferably in the form of specially formed coils fabricated out of copper or other suitable metal or alloy having high conductivity. This battery of quick heating and pre-steaming elements is carried in a supporting tubular frame 23' which preheats and supplies the water from the water jacket to the battery elements and conducts the steam or heated water from the same to the steam chamber or to the uppermost portion of the water in the water jacket. In my preferred form, as one of the novel features of my invention, the tubular frame 23' is suspended from the crown sheet by a stemmed stirrup form which necessitates the cutting of but a single hole in the crown sheet to install an entire battery of the pre-steaming elements, whereas normally each coil or heating element requires an individual outlet and intake opening, cut in the side walls of the firebox walls, thus requiring in the field work installation the cutting of twelve holes for six coils and the corresponding number of fitting connections and their expensive welding in place, whereas one of my six coil battery units requires only one such operation, and three units of six coils each can be installed with but three holes as compared with the otherwise normal thirty-six.

Also it should be particularly noted that in the past it has been necessary in installing such coils in the field to provide, first, special bushings or receptacles welded into the boiler walls after cutting holes for same and then to screw into these special couplings in the form of expensive railroad unions (as designated in the trade) which in turn have to connect with brass connections known in the trade as adapters which in turn must first be brazed to the coil ends. In my novel prefabricated factory assembled batteries, by contrast, practically all this can be done away with, eliminating the railroad unions, when desired, and the greater part of the other fittings and permitting the copper coils 22a to be directly connected into the tubular frame 23' by factory assemblage with improved and varied methods of inexpensive mass production including single operation brazing not applicable to, or possible in field installations.

The number and size of the battery units installed in the firebox is optional and determined by the size of the boiler, firebox, radiation to be served, etc. In a preferred form, however, as indicated in Figs. 1, 2 and 3, I employ three battery units 22 as noted. In conjunction with a stoker firepot, when an underfeed stoker is used, and this is the more common installation to be met with, I suspend one battery unit on either side of the firepot, extending in a generally or approximately longitudinal direction in relation to the longitudinal axis of the firebox, and where conditions permit, a third unit at the back end of the firebox or in front of the intercepting wall 13 and centered over the compression and mixing exit hole 14. I preferably converge the two longitudinal batteries somewhat towards each other as they approach the back end of the firebox as indicated and as more clearly shown in Fig. 3, and my single stem tubular stirrup suspension frame 23' permits of so rotating the battery unit frame in the field installation, prior to welding in place, as to readily adjust and set these to the desired converging angles.

As will be noted, in my preferred form I novelly construct my individual coils 22a, so that they are relatively long and comparatively narrow. This novel design for this purpose and use has a number of distinct advantages. First, it is possible to install a larger number of coil units within the longitudinal length of the stirrup because of the narrowed width of the coils. Second, it permits of a fewer number of and more easily formed turns in the coil for the same length of tubing and provides greater efficiency, because a greater length of the coil, and so a greater area of metal, is exposed in the bottom of the coil and nearer the fire where the greatest amount of heat is absorbed. More particularly, however, in addition to permitting the use of a greater length of tubing, and so securing a greater heating area, it permits lowering the height of the coils so that a relatively shallow unit of fewer turns is made possible, with the same or greater amount of heating area, thus permitting the building of a factory pre-assembled battery unit which can be introduced into the firebox for installation through the limited dimensions of the firebox door of a boiler and have at the same time greater heating area. This makes feasible this improved method of manufacture and installation while at the same time increasing the efficiency of the coil itself. In this connection it should be realized that this extra efficiency is also procured through this coil having a greatly increased cross sectional fire base as compared with the customary taller coil with its smaller circular firebase. By fire base, I mean the horizontal cross sectional area overhanging the firebed and rising combustion gases. It will be understood that as these burning gases rise and contact the pre-heating coils they are hottest on their first contact with the said coils and consequently become cooled thereby as they pass on upward and outward. In consequence of this obvious action my long shallow coils have a much greater percentage of their tubing exposed to the first and hottest contact of these gases, and the same may be said of the radiant heat waves so that the coils absorb a much greater percentage of heat and at a much more rapid rate.

Figures 13, 14:
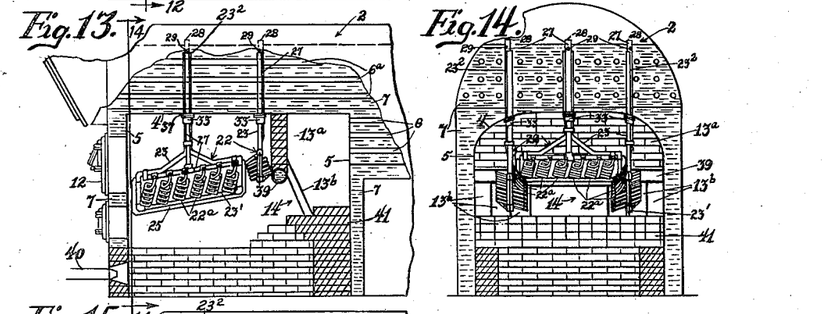
Fig. 13 is a fragmentary longitudinal sectional elevation showing battery units installed in a firebox of a modified type of boiler in combination with a modified form of intercepting refractory wall.
Fig. 14 is a fragmentary transverse sectional elevation of same taken through the front end of the firebox on the line 14—14 of Fig. 13.

For the same reason I also preferably tilt my coils towards the fire in two directions. First, I tilt them forward so that in so overhanging the firebed, baffling of the respective turns by the underlying turns is lessened and each individual coil turn is exposed to a greater amount of heat without obstruction. For the same reason I tilt them sideways on their other or long axis as indicated in Fig. 1, so that the rising gases and projected heat rays contact to a greater extent the length of each superimposed coil turn with the minimum amount of baffle obstruction and at a more abrupt angle so as to produce the least deflection and the greatest amount of heat absorption. These arrangements can, of course, be greatly varied to suit special wants and where it is desired to facilitate the draft and accelerate the rate of flow of the gases I may tilt the coils towards the back end of the firebox (as shown in Fig. 13), rather than towards front end as shown in Fig. 2. I also preferably set the coil units diagonally in the stirrup frames as indicated and more clearly seen in Fig. 3, so that their formation is en echelon with the result that the step formation so secured exposes each coil to a greater contact with the onward traveling burning gases and heat waves and traps same against the offset coil ends which in this way are not so much baffled by the adjoining coils, as would otherwise be the case. By slanting my elongated coils diagonally within the frames 23', as shown, I am also able to confine them within a narrower space and so better to space them away from the chilling sides of the water jacket of the firebox and also expose a longer area of coil closer to the fire and combustion core with corresponding increase of heating efficiency. While the coils may also be built with uniform dimensions for the several turns so that their sides are straight up and down, as indicated in Figs. 1, 2 and 3, another desirable form is shown in subsequent Figs. 27 and 28, where I progressively narrow the narrower or transverse width of the turns so that the long sides of the coil taper inwardly somewhat, thus giving increased contact heating area to gases rising within the coil, as readily discernible from cross sectional Fig. 28.

In suspending the longitudinal battery units 22 in the firebox, I locate them approximately on the border of the main combustion zone or just outside the main core of the burning gases traveling from the firepot toward, and having its path largely determined by, the exit opening 14, so as to secure a maximum amount of heat absorption without too severely cooling or interfering with the combustion of the escaping gases. At the same time I space them away as far as possible from the side walls of the water jacket of the firebox so as to avoid, as far as possible, the cooling effects of same. Also, while the longitudinal frames 23' may be positioned parallel with each other and the corresponding sides of the firepot, and approximately directly above sides of same, or as adjacent thereto as the gas combustion core properly permits, I preferably slightly converge the opposing frames 23' toward each other as more clearly noted in Fig. 3. This widens and facilitates access to the front end of the firebox for hand firing of garbage, papers, rubbish, etc., commonly so burned; and likewise protects the coils at this point from injury by their being set further apart and out of the way at the front or door end of the firebox. This also is better for the combustion at this front end of the firepot where the fire is getting under way, the firebox is cooler and the combustion correspondingly less advanced and which, accordingly, should be subjected to coil cooling more gradually and at a greater distance. Furthermore, this arrangement gives standing and working space and access at the front of the firebox for workmen cleaning or making repairs in the firebox. As the combustion gets further under way as the burning gases proceed toward the back of the firebox and the exit 14, they are less susceptible to deleterious cooling and the coils can approach closer to the burning core and absorb thereby a greater amount of heat and this is happily accomplished by this preferred converging setup of my stirrups and this arrangement so serves several desirable purposes. By pivoting my frames 23' on a single stem connection, as already noted, I am able in installing same in the firebox to rotate same before final welding in place, so as to secure quickly, easily and exactly just the desired convergence as determined by the size, shape and conditions of the firebox of the particular boiler in which the installation is being made.

While in many cases only the two longitudinal battery units of Figs. 1, 2 and 3 will be installed in a firebox, where space permits and it is desired to still further increase the efficiency and capacity of the boiler, as already noted, I install the third battery unit shown, transversely of the firebox beyond the longitudinal units and in proximity to the exit opening 14, over which it is centered, preferably directly above same, as shown in Figs. 1, 2 and 3. The flow of the burning gases can be regulated and diverted upward as they travel toward the back of the firebox by means of the damper and fly draught controls 16 and 16a. By this means, particularly the opening of the fly 16a, the burning gases projected by the forced draught from the tuyères 10, can be made to rise more vertically and thus forced upward, against and through the coils to any desired degree and angle. Passing through the coils of the side longitudinal batteries in this way these burning gases loop downward as they travel onward and in turn pass through the coils of this third and transverse battery unit above the exit opening 14 for which they are headed. At this point this portion of the escaping gases and air meets, collides and mixes with the burning and other gases coming from the sides and bottom of the firebox and the direct superheated burning gas core coming directly from the nearby and hottest end of the firepot. All these gases and air, hot and cold, meeting at this approach to the exit opening 14, become mixed and compressed as they are forced and drawn through the relatively small exit opening. In this way the superheated gases, assisted by the heat of the compression and the new combustion now set up, together with the radiant heat from the refractory intercepting wall 13, tend to raise the temperature of the possibly incompletely burnt gases chilled by contact with the preheating coils, so that these gases together with any cold air blown from airholes in the firebed are largely brought to the combustion point before escaping into the flue chamber, and a maximum of combustion efficiency and a minimum of smoke so secured.

In Fig. 3a I show a novel form of tubing which can be used in forming my heating elements or coils 22a where it is desired to give the copper tubing or other metallic quick heating elements special protection from deterioration or burning through by prolonged or particularly severe exposure in the firebox to corrosion, oxidation or shock from too intimate or protracted contact with the fire, flames and heat, and the effect of the combustion gases. For protection against such and to insure extra long life to the coils or heating elements, I build my tubing with a plurality of walls, the interior wall 22b, being of high heat conductive metal such as copper or copper alloy and under this special arrangement I preferably employ a thinner wall or lighter gauge of metal than would otherwise be used in the regular tubing. Over this I form an outer wall 22c of protective metal particularly suited to resist the destructive and deteriorating exposure encountered in the firebox. This outer resistant wall 22c is metallically or molecularly united to the inner wall 22b and is also preferably of thin gauge or thickness and no greater than that required to insure the proper protective resistance. It should also have as high heat conductivity as may be possible for metal having the necessary resistant properties which are the first consideration; however, in this outer protective wall. To supply this structure a light tube or jacket of iron, steel, alloy, or other suitable protective metal can be slipped or wrapped tightly over the inner copper or high conductive tube and the two can be metallically united by light heat conductive silver solder or other brazing material. This can be advantageously done by shrinking the outer tube 22c on to the inner tube 22b, with and intermediate infinitesimally thin layer 22d, of the brazing metal by means of my brazing process disclosed in my Patent No. 1,930,285, issued October 10, 1933. In the case of my coiled heating elements the tube wall can be formed in this way in the straight and subsequently coiled. The multi-walled structure in this or equivalent form can extend the entire length of the tubing but where desired only those portions of the tubing or coil which are more intensively exposed to the flame, heat and combustion attack, need be so constructed, as for example, the lowest or bottom turn of the coil or the portions of the upper turns more particularly exposed or closest to the fire such as the turns at the end of the coil which directly overhang the fire in various cases and so may be more in need of the protective or plural wall. The remainder of coil tubing not seriously subjected to such attack can be of the single wall or regular conventional tubing. It should be particularly noted that my construction permits of applying the multi-wall or thickened wall at separate and specific intermediate points anywhere along the length of the coil or tubular heating element, leaving the other portions bare or thinner for faster heat absorption as desired. This operation can be completed before bending of the tubing where same is bent, or the jacket element 25 can be stamped to the curvature and added after such tubing is bent.

Other modified forms of my multi-walled tubes will be subsequently described. In all of these an important feature is the elimination of pitting and pit hole weaknesses which might otherwise develop a leak in a single or the inner tube wall. Where such weaknesses are present the stratification so to speak of my tube walls in several distinct layers metallically jointed and, as in various cases, of different metals, prevents the wall being punctured by such pitting inherent and developing in the single wall layer.

In Fig. 3b is shown a method of finning the bottom or sides of conventional tubing of copper or the like for use in my coils or quick heating elements 22a or for my tubular frames 23', etc., which also serves as a prolonger of the life of the tubing as well as an absorber, distributor and equalizer of the heat, providing greater efficiency of the coil or water heating element. In this instance the fin 25 is stamped out of flat sheet metal so as to form the projecting arms 25a which are folded outward in the stamping and then in attaching the fin to the tubular member, as 22b, are clinched around same as noted and the two opposing metal walls so formed, metallically and molecularly united in the brazing bath by the brazing 22d. These fins or other similar ones can also be formed and applied in modified forms and to either the desired parts of the coils or quick heating elements 22a or to any desired parts of the tubular preheating members or frames, as 23', and some of these modified forms for such purposes will be subsequently noted as in Figs. 22, 23, 29, etc. As in the case of Fig. 3a, the protective fin elements 25 of Fig. 3b can be of special heat and combustion resisting metal such as suitable ferrous, ferrous alloy or other metal, while the tube 22b can be of high heat conductive copper or other metal. Likewise, the arrangement can be just the reverse or the tube and fin can be of the same metal emphasizing either heat conductivity or combustion resistance, as the case may be.

Figures 4, 5, 6, 7, 8, 9, 10:
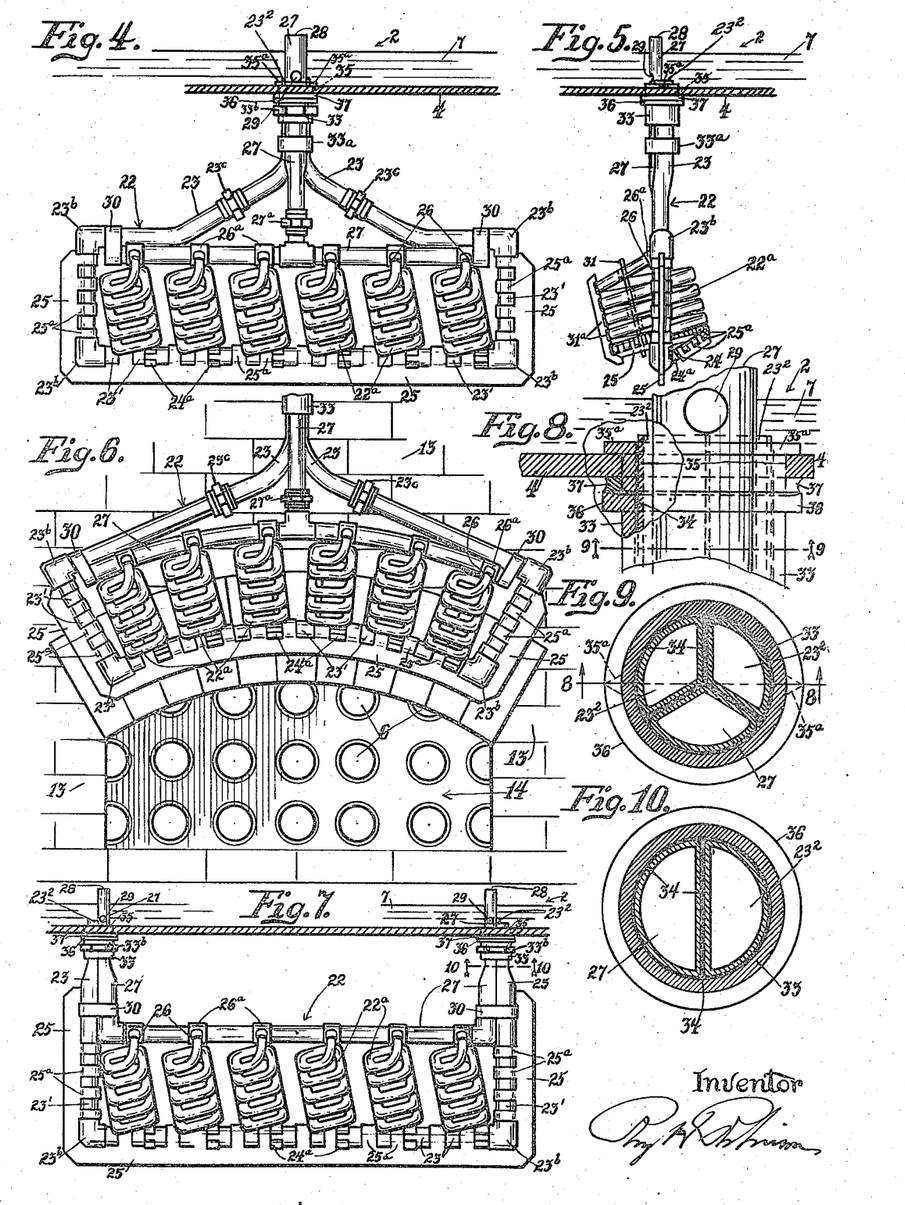

Figs. 4 and 5 show a battery unit 22 of the type employed in Figs. 1, 2 and 3. As shown in Figs. 1 to 5, the frame of a battery unit is formed of an inlet tube 23 and an outlet tube 27. The inlet tube 23 is formed in a loop with the ends projecting upward and this loop is united with the outlet tube 27 of inverted T shape, to form a right angled parallelogram having two long horizontal sides and two short vertical sides. A plurality of coils 22a are connected between the head of the inverted T and the lower portion of the tube 23. The upper end of the tube 27 and the two upper ends of the tube 23 are brought together and secured in a hole in the crown sheet as shown in Figs. 8 and 9. Water enters the upper ends $23^2$ of tube 23, passes down through the frame and up through the coils to be discharged through tube 27 as water or steam, into the water or steam chambers. While the construction of these units can be greatly varied in design and materials used, in this instance, the supporting frame 23' is formed of pipe or tubing shaped with elbow connections, as noted, to form a containing stirrup frame within which the pre-steaming coil elements 22a are installed and supported with their lower intake ends connected to the lower portion of the intake tube 23 by the connections 24. Through these connections 24 the inlet pipe 23 feeds the hottest water taken from above the crown sheet, into the coils 22a and pre-heats this water as it passes through the framework to the said coils. To further increase this preheating, the tubes 23 are preferably provided with heating fins 25 brazed or otherwise formed or attached on the tube 23, as noted. After the preheated water from tube 23 passes into the presteaming copper coils 22a, it is raised to the steaming point and passes out through the outlet connections 26 into the outlet tube 27 which is T-shaped and leads through the crown sheet into the steam chamber and above the water over the crown sheet, delivering the steam through its outlet 28 directly into the steam chamber 2. In this way the steam chamber can be filled with steam from the pre-steaming batteries independently of the steam of the main body of water in the boiler and with great saving of fuel and time. Also, by the steam being conducted directly to the steam chamber without passing through and mixing with the cooling waters of the water jacket, the rapidity of the steaming is obviously greatly increased. Preferable or unless otherwise desired I also provide in the outlet tube 27 a water intake and outlet opening 29 below the water line so that when the battery coils 22a are not steaming, they can circulate hot water through the frame 23' and deliver same into the water jacket through this auxiliary outlet 29. This keeps up circulation and continual heating of the water in the coils 22a while the fire is banked or heating between running operations. On the other hand, when the steaming temperature is reached in the coils, the water is forced out of the outlet tube 27 and the greater pressure of the steam keeps the water out at 29 and delivers the steam through the outlet 28 in a continuous flow without it having to pass through the chilling water of the water jacket.

The outlet tube 27 is preferably joined to the two ends of the tube 23 by enveloping copper straps 30 (see Fig. 4) which are brazed around the adjacent tubes 23 and 27 as noted. The intake and outlet connections 24 and 26 of the coils 22a can be of any desired type, but I preferably form these from heavy sheet copper with drawn flanged collars 24a and 26a (Fig. 4) which closely house the terminals of the copper tubing of the coils 22a on to which they are brazed. These stamped copper connections are centered on corresponding openings formed in the tubes 23 and 27 and are bent to clamp around same. These connections can also be formed of steel or other desirable metal and likewise can be merely the customary T pipe connections. When the batteries of coils, connections and framework are assembled in their related positions, the entire structure can be brazed in one operation so as to be integrally united in a strong steam-tight structure. In the same operation the fin 25 can be brazed to the pipe or tube 23 when not integrally formed on same. This fin, as already described in connection with Fig. 3b, can be formed of heavy sheet copper stamped with cuts to form slotted bent out feet or arms 25a along its edge which are bent to clamp on to the pipe 23 and become brazed to same in the brazing operation. This formation of my tubular frame structure permits of the use of different metal in the fin from that of the tube itself and, as already pointed out, where desired, the fin 25 can be formed of iron steel, alloy or other metal more durable under combustion exposure than copper, while the tube 23 itself can still be formed of high heat conductive copper, or the combination may be exactly the opposite, i. e., iron or steel tube or pipe and copper fin. My novel arrangement so permits of a wide variety of metals in varied combinations to best suit the particular needs of the situation.

Where it is desired to further improve the efficiency of the coils as well as protect and strengthen same and provide supporting stiffeners in addition, I similarly braze cross fins 31 to the coils, as indicated in Fig. 5, and these can be in any desired number and on any desired spacing. These can also be similarly stamped out of sheet copper with extending feet or arms 31a which are bent to clinch on the copper tubing of the coils and become brazed to same in the general brazing operation. By projecting these substantially below and under the lowest turn or bottom of the coil, as indicated, I so novelly provide protective means for taking the too sudden or intense shock of the flame off the lower turn of the copper tubing, most vulnerably exposed to same, while at the same time, by so absorbing the super-heat by conductive transmission to the upper turns of the coil, I equalize the heat distribution so as to further protect the lower coil turn from disproportionate metal strain and deterioration which might otherwise occur, due to its position in meeting the initial flame and heat attack. These cross fins can be applied at desired spaced apart intervals in any preferred number and on all sides or any sides of the coil, but in the simpler form I attach them only on sides or portions of the sides closest to the fire or the burning gas core. I also, for the same reason when desired, attach similar copper heat distributing fin 25 with the clinched and brazed arms 25a along the bottom of the lowest coil turn to absorb and distribute the heat over a greater area and thereby protect the lower tubing closest to the fire from too localized shock as already described in connection with Fig. 3b.

The coil units 22a are preferably connected at 24 on the back side of the supporting tube 23 in relation to the fire and away from same so that they are shielded from the hottest and most direct flame shock by the cooling tube 23. This supporting tube member 23 can be, as already noted, of either iron or steel or, where greater conductivity is desired, of copper or copper alloy, and is of heavier wall thickness than the tubes of the battery coils. Being filled with the colder water coming to the coils and being placed below the lower turn of the coils and so closer to the fire, this tube member 23 creates a cooling and shock absorbing zone underneath the coil batteries for dissipating the fire shock and so protects the more delicate and lighter walls of the lowest turn of the coils, thereby further preserving the life of the metal.

The metal fins 25 attached or formed on the tubing 23, serve a similar purpose in absorbing the flame and heat shock and absorbing and distributing the heat into the preheating tube 23. The fin 25 can be attached to the tubing 23 in any desired number at radiating angles. In its simpler form, however, shown in Figs. 4, 5, etc., only a single fin is shown, but I do not so limit the construction. This fin is preferably formed out of heavy copper sheet stamped to form the cut feet 25a on one edge which are bent outwardly in opposite directions and clinched around the pipe 23 and brazed thereto in the general brazing operation of the entire frame. The fins so formed and attached to the supporting tube 23, serve the multiple purpose of strengthening and stiffening the supporting tube 23, conducting a greater amount of heat, more evenly distributing it for the preheating of the water therein and finally giving further protection against fire shock to the metal walls of the tube 23. With this fin stiffening and protection the tube 23 can be made of copper instead of iron or steel, when desired, thus multiplying the heat absorption of the tube many times because of the greatly superior conductivity of the copper. Also the fin 25 can be made of steel or iron, as noted, for tougher usage and combined with a copper tube 23, to stiffen and protect this weaker metal.

When desired and particularly if the copper tubing is used for the pipe member 23 of the stirrup frame 23', the corner elbow connections 23b can be omitted and the stirrup frame formed out of a continuous piece of copper tubing bent to form the complete stirrup. In doing this instead of right angle turns the end or side portions of the frame are curved to suitable loops and the applied fin 25, providing a flange formation as it does, supplies the necessary rigidity for preventing the frame sagging or losing its shape. Where a still greater rigidity is wanted this fin can be formed of steel sheet, as already noted. The outlet tube 27, receiving the steam from the coil outlets as 26a and delivering it into the steam chamber at 28, is preferably made of copper for greater conducitivity and heat absorption. This, however, also can be made of steel or iron if desired.

The stirrup frames 23' can be designed and constructed in a great variety of ways other than described herein without departing from the spirit of this invention and in subsequent figures I will show still further desirable forms for same although my invention is not restricted to any one of these. Where it is desired to have the battery units 22, as in Fig. 4, etc., removable from the firebox at any time, or where installation requirements dictate, the tubular frame can be provided with a railway union 33b in the suspension connection 33, as indicated, or instead, railway unions 23c and 27a may be provided lower down on the frame tubes 23 and 27, respectively, all as indicated in Fig. 4, etc., it being understood that any or all of these railway unions or equivalent connections may be omitted when so preferred and as indicated in other figures.

In Fig. 6 the stirrup frame 23' is formed to a curving segment in combination with a curved segment brick arch for the gas exit opening 14. These curved stirrup forms radiate the coils of the battery in relation to the core of the fire and likewise the exit opening so as to approximate an equalization of radial spacing from same. The curved formation is also advantageous in giving a particularly strong supporting frame designed to especially resist sagging under heating strains. Where it is found that the extending frame stem of the battery unit 22 interferes with introducing the unit through the firebox door, or where it is desired to have the battery unit 22 readily removable from the firebox at any time, railway union connections can be provided for the tubes 23 and 27, the same as in Fig. 4, as indicated at 23c and 27a, or 33b. Similarly, when it is desired to have the individual battery coils 22a removable from the stirrup frame at any time, these also can be provided with individual railway unions adjacent the connections 24 and 26, on any of the frames.

While in my preferred form in forming my battery units 22a I use copper or high conductive tubing in coiled form—the coiling of which can be arranged in a great variety of shapes—I do not limit my pre-steaming elements to coil forms alone and when desired may use other hollow or tubular shapes as, for instance, straight fin tubes as disclosed in my pending application Ser. No. 145,058 (Patent No. 2,291,921), or other desirable formations in lieu of the coiled elements. Because of the greater lineal feet or radiation area that can be compacted into a limited space, in most instances, however, I prefer forming my units in coiled formation, the shapes of which can be greatly varied to best suit the needs of the situation.

In Fig. 7 is shown a modified form of connecting the battery frame to the overhead crown sheet where it is desired to support the frame from both ends rather than merely from the center. This arrangement of the connections of the battery unit divides the load and places it on the crown sheet adjacent to the supporting steel side 5 of the firebox at the one end and the intercepting wall 13 at the other. It also permits introducing a larger one piece battery frame through a firebox door by hooking same through the door. While the stirrup frames of Figs. 4 and 7 are rectangularly formed, as noted, and for level suspension, they can also be shaped to have their various sides joined at any suitable angles particularly when suspended in other than a level position as indicated in Fig. 2 and elsewhere, where it is desired to so relate the frame position to the burning gas core in the firebox so as to more nearly parallel same to the rising core or main path or hottest part of the fire, the cumulative heat of which increases as it approaches the exit opening 14. As indicated, the crownsheet connections 33 can be provided with railway connections 33b for the frame of Fig. 7, the same as in Fig. 4, etc., when it is desired to have the battery unit easily removable or handled separately in installation.

Figs. 8 and 9 refer to the details of the construction of the intake and outlet openings for the frames 23'. The intake tubes 23 and the outlet tube 27 are embraced and united as they approach the crown sheet 4 within an iron or steel collar 33. The tubes are pressure shaped or deformed as they approach the embracing collar so as to pass through and fit together within same, as indicated in cross sectional Fig. 9. In such position they are solidly brazed together and to the collar as shown by the brazing 34 so as to form a solid and watertight connection. When the stirrup frame 23' is set in place in the field an aperture 35 is first cut in the crown sheet 4 to admit the collar 33. The collar is provided with a projecting flange 36 and this preferably slants slightly downward toward the wall of 33 as indicated in Figure 8. In setting the battery unit in place in the firebox, this flange 36 is positioned slightly below the lower surface of the crown sheet 4 to provide a welding slot or pocket between the two. The purpose of this and this novel connection is to do away with the difficulty heretofore met in overhead welding. It is a well known fact that overhead welding is difficult and undesirable because the molten metal tends to fall away under the force of gravity. My flange connection 36, however, spaced away from the crown sheet, providing as it does a horizontal welding pocket permits the arc electric welding metal 37 to be readily deposited in this pocket with the same ease as in the case of an ordinary horizontal or vertical weld (as distinct from the much more difficult and very troublesome "over-head" weld which would otherwise be encountered) and in this way the battery unit is quickly and tightly welded in place in the shortest possible time and with a minimum of expense. It will be noted in this connection that the inward slope of the flange 36, forming the welding slot, tends to cause the momentarily molten welding metal to run or draw inward instead of outward in the welding pocket in building up on the supporting base provided by 36. In order to hold the welding collar connection 33, with or without the balance of the battery tubular frame attached to same, while welding to the crownsheet, I also preferably provide the welding collar with small projecting lugs 35a, on opposite sides of the collar at its upper edge, for engaging on top of the crownsheet and so suspending the collar and frame without the need of further temporary support while welding the connection in place. In cutting the aperture 35 in the crownsheet to receive 33, proper side slots are also cut to receive these projecting lugs 35a so that after slipping the lugs through these slots, a slight rotation of 33 engages the supporting lugs on top of the crownsheet. In forming the frame 23' for the battery units, where the stem is long, an additional embracing collar band 33a can be added further down below the welding collar 33 as shown in Fig. 4, etc., and brazed to the tubes 23 and 27 so as to strongly secure and unite same.

In Fig. 10 is shown a cross section on the line 10—10 of Fig. 7. In this arrangement the preheating and water supply tube 23 and the steam outlet tube 27 are flattened on opposing sides as they approach the circular welding collar 33 so as to form semicircles which are brazed into the collar 33 and to each other by the brazing 34 as noted.

Figures 11, 12:
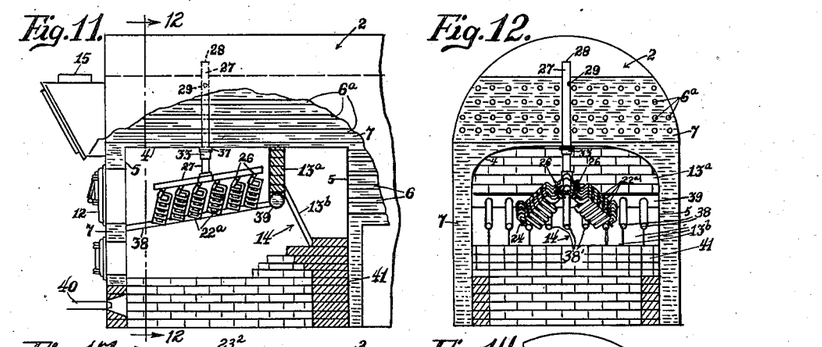
Fig. 11 is a fragmentary longitudinal elevation of a modified form of pre-steaming battery installed in a modified form of boiler.
Fig. 12 is a transverse sectional elevation of same taken on the line 12—12 of Fig. 11 through the front end of the firebox.

Figs. 11 and 12 show a common type of boiler in use having what is known as a down draft firebox with an upper grate formed of tubes 38 extending across the firebox on spaced apart centers and connected with a header tube 39 at one end and the water leg wall 5 at the other end so as to circulate the water through same. The firebox is built extra deep for the use of underfeed stokers and oil burners. In Fig. 11 the boiler is equipped with oil burner 40 which is located on the central longitudinal axis of the fire box and discharges against the corbelled firebrick baffle wall 41. In this instance I readily adapt this firebox for use either with an underfeed stoker or the oil burner indicated to my pre-steaming coils in any one of a variety of ways. In Figs. 11 and 12 I form my intercepting wall 13 by building up the baffle 13a on the header tube 39. I then form my exit opening aperture 14 by closing in the sides between the corbelled wall 41 and the upper baffle wall 13a with firebrick slabs or other suitable refractory material 13b, leaving the exit opening in the center directly under the header tube 39. I then mount my battery of coils directly on certain selected tubes of the grate tubes 38 in which I cut the proper connection holes and weld bushing or receptacle connections thereto with railway unions which are joined to the inlets 24 of the battery tubes 22a. Where the firebox is built especially deep for the use of under feed stokers and oil burners as is now done in more recent models I preferably mount the battery coils 22a in tilted rows arched directly over the firepot in the case of the stoker installation, or directly over the path of the projected burning oil in the case of the oil burner installation as indicated in Figs. 11 and 12 operatively connected to the tubes 38 on which they are supported. In doing this I preferably remove the central group of the water tubes, as 38', plugging their connection holes. I then connect my coils 22a into the overhead steam receiving tube 27, the outlet of which extends upward through the crown sheet 4 after the manner of my other coil frames. This is provided with the welding collar 33 which is jointed by the weld 37 to the crown sheet as already described. In this conventional type of boiler, the gases escaping to the exit opening 14 into the back chamber of the firebox so formed by the refractory brick work which I set up in the firebox, as described, pass outward, first through the boiler tubes 6 and then reverse and pass back through the tubes 6a located in the water compartment about the firebox crown sheet and escape into the stack at 15.

Preferably in order to deliver the steam from the pre-steaming coils 22a directly to the steam chamber 2 in this type of boiler, I extend the outlet tube 27 upward from the crown sheet between the flues 6a to a point above the water line. If necessary, to facilitate the slipping of the extended tube outlet 27 in place between the overhead tubes, I flatten this where the boiler tubes 6a may be spaced on close centers so requiring. Under this arrangement the flames and heat discharged by the oil burner on to the baffle wall 41 are thrown backward in the customary manner and projected upward toward and against and in part through the overhanging coils 22a as the main core of the burning gases passes out through the exit opening 14 which mixes together and compresses the hot and cold or cooling gases meeting in their exit from all parts of the firebox, thereby raising the temperature and restoring the combustion to the unburnt gases and those cooled in their contact with and heating of the battery coils 22a. The water feeding the battery coils is circulated from the water jacket and is preheated in the tubes 38 and the header tube 39 which serve in lieu of any other preheating tubular frame 23'. The water so preheated is then pre-steamed in the battery coils 22a and delivered to the steam chamber 2 without waiting for the main body of water in the boiler to be raised to the steaming point as already heretofore outlined.

In cases where the so-called down draft tubes 38 are located nearer the firebox bed as in the case of older type down draft boilers which do not provide the same head room for combustion above the firebed, it may be found desirable to locate the battery coils 22a on selected grate tubes 38 which are nearer the sides of the firebox and where they are located on the edge of the main fire core but preferably still substantially spaced away from the cooling water jacket so far as possible. In such a case a larger number of the centrally placed, over grate tubes 38 are preferably removed from directly above the fire between the opposing batteries 22 which are preferably tilted toward each other and so as to overhang the rising gases or the forward traveling combustion core. If in such arrangement it is not found desirable to connect the coils in their outlets 26 to an overhead steam discharge 27, they can be connected directly to holes and railway connections formed and attached to the shell of the water jacket, but this is not as desirable in so much as it requires additional field work and delivers the steam directly into the water chamber instead of directly into the steam chamber. Where twin oil burners are used, as in larger boilers, symmetrically disposed on either side of the central axis of the firebox, a duplicate set of the battery setup, instead of a single setup, as shown in Figs. 11 and 12, can be similarly provided and similarly located for each oil burner axis and correspondingly two exit openings 14 instead of one are similarly provided—and on each oil burner axis. The same duplicate arrangement can be made should two underfeed firepots be similarly installed in the firebox.

Figs. 13 and 14 show a boiler similar to that of Figs. 11 and 12, with the exception that the downdraft grate tubes 38 are omitted. In this case I suspend my pre-steaming battery frames 23' in the firebox as noted after the manner of Figs. 1, 2 and 3, only in this instance I show the battery coils 22a located in the two longitudinal frames, tilted toward the exit opening 14 rather than away from it. Under this arrangement the heated burning gases recoiling from the baffle wall 41 in part pass upward through the overhead coils 22a towards and down through the transverse unit 22 located directly over the exit 14. This arrangement can of course be varied at will.

Figures 15, 16, 17, 17A:
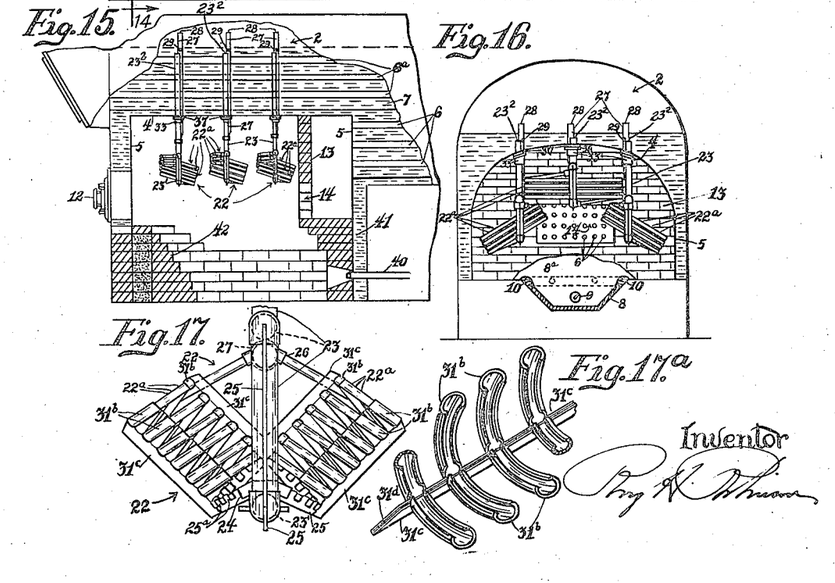
Fig. 15 is a fragmentary longitudinal sectional elevation showing a modified form of pre-steaming battery installation in a modified form of boiler with a modified form of intercepting refractory wall.
Fig. 16 is a fragmentary transverse sectional elevation taken through the front end of the firebox of a typical boiler with a modified form of pre-steaming battery installation.
Fig. 17 is a fragmentary side elevation of a modified form of pre-steaming battery unit with protected tubing.
Fig. 17a is a fragmentary perspective of fin and protective armor for tubing employed in Fig. 17.

In Fig. 15 is shown a boiler somewhat similar to that of Figs. 11 and 13 with the exception that the header or cross tube 39 is omitted from the boiler and the boiler is fired from an oil burner 40 from the rear instead of from the front of the firebox as noted. The fire from the oil burner in this instance is projected on the front baffle wall 42 built in the firebox. At the back of the boiler on the front edge of the corbelled wall 41 I build my intercepting wall 13 with the exit opening 14 located on the central longitudinal axis of the oil burner. The same arrangements can of course be made for an underfeed firepot. Above the path of the burning gases proceeding off the baffle wall 42 upward and to the exit opening 14 I suspend a plurality of battery units 23', preferably of the arched form shown in Fig. 6, the arched formation being conformed to the main core of the burning gases so as to absorb a maximum amount of heat without serious interference with the combustion which is finally and completely consummated in passing through the compression exit opening 14. While any number of these battery units 22 can be so employed and so set up transversely in the firebox, in this instance I show three, the front one being preferably set closer to the firebed than the next one and so on at progressively greater distances from the firebed.

In Fig. 16 is shown a boiler arrangement in which the intake $23^2$ and outlets 28 and 29 are particularly arranged in relation to each other so as to circulate the water and produce steam by progressively stepping up the temperature of the uppermost layer of water in the water chamber so as to produce steam while the fire, or stoker, is at rest. In this instance three of the heating units 22 are suspended from the crownsheet and located approximately longitudinally of the firebox as indicated. The frames 23' are each provided with a plurality of battery units 22 after the manner of Fig. 4, etc., the battery units preferably being formed very long in relation to their width so as to present a large heating area or base for exposure to the firebed and so absorb a large amount of radiation while the fire is resting. The coils 22a of the two side frames are tilted as noted so as to be approximately tangent to the firebed while the central frame carries its coils, 22a, leveled and above the center of the firebed.

The outlet tubes 27 of the two side frames are provided with the side water intake ports 29 while the outlet tube 27 of the central frame has this omitted. Under this particular and unique arrangement, when the stoker is resting, the water is received from the intakes 24 of the two side frames and circulated through the coils 22a and returned at a higher temperature through the outlet holes 29. The temperature of the water at the top of the water chamber in this way is continually raised, but not necessarily to the steaming point, due to the fire resting. The water does not have to wait in the coils, however, until it reaches a steaming point but instead keeps circulating and getting hotter and hotter in the upper strata of the water chamber. As it rises to this top level in escaping from the holes 29 it is picked up by the intake 24 of the central heating frame which in this instance is primarily a steamer as distinct from just a heater, owing to the fact that its outlet tube 27 discharges only at 28 in the steam chamber above the water and is devoid of the outlet hole 29 below the water line. This steamer unit, taking the super-heated water delivered by the two side heater units, holds this water in its battery coils until its temperature reaches the vaporizing or steaming point when it delivers the steam to the steam chamber from its outlet 28, notwithstanding the fire being in a rest period or even banked for the night. In this way it will be seen the water of the boiler is kept under constant circulation and heating by virtue of the side frames while at the same time steam can be produced by virtue of the central frame. To facilitate this steaming, the coils 22a of the central frame are made particularly long as noted while still being kept narrow in width so that the water in the tubes lies on an excessively large heating base over the fire bed so as to absorb a maximum of heat as rapidly as possible, while by being kept narrow in width a large number of the coils can be mounted within the supporting frame as already pointed out. With this unique arrangement of coils and connection it will be seen that in operating a stroker on a pressurestat or other automatic control, the steam chamber may already be provided with steam when the stoker comes on after a shutoff or rest period and so the steam pressure is raised in a much shorter period of running time and accordingly the running periods abbreviated and the rest periods prolonged, with a corresponding saving in fuel.

Fig. 17 shows a modified form of the type of frame indicated in Fig. 4. In this instance, instead of a single row of coils 22a being mounted on the frame 23', a double row of coils, as noted, is connected to the bottom member of the frame 23' and preferably tilted outward as indicated. This frame with its double row of batteries (the form and position of which can be greatly varied), can be used to advantage particularly in fireboxes of the type of Figs. 11 and 12, 13 and 14, and 15, where the fireboxes are designed especially deep for the use of stoker and oil burner units so as to provide the necessary overhead combustion room above the fire. Under these conditions this double row battery unit can be suspended directly above the bed or path of the fire after the manner of Fig. 12, and the battery row can be mounted on a single or double stemmed frame 23', as in Fig. 4 and Fig. 7, respectively, or with the tube base 38 arrangement of Figs. 11 and 12 or the frame arrangement of Fig. 26, or with other modified forms. These units may also be placed in the firebox in any number and in any desired position as best suited to conditions. Where twin oil burners or other firing units are employed in a firebox, these battery units are particularly desirable for suspending between the parallel paths of the two fire cores and each such burner and fire core can be provided with its own exit opening 14 in the wall 13, centered on the axis of the firing unit and core and spaced away from the water jacket shell on all sides.

In Fig. 17a is shown a special protection and finning for any of my coil units where such protection is desired to resist severe fire and combustion exposure, corrosion, etc., or where extra life of the tubing of the coils, etc., is particularly desired. The coils in Fig. 17 are shown with such special protection as in such case when suspended directly over the fire core, especially from an oil burner, the quick heating tubes of copper or other suitable metal may suffer particular hardship on the surfaces most exposed and closest to the fire attack. In Fig. 17, accordingly, the bottom of the lower turn of the coil 22a is protected with a heat absorbing and equalizing fin, 25, applied or secured thereto with the protective and holding arms 25a which are clinched and metallically united therewith as described in the case of Fig. 3b. The faces of the remaining turns of the coil on their portions most exposed directly over the fire are protected by extra walls of metal 31b which are also molecularly united to the tubing walls of coils 22a by brazing the contacting metal surfaces throughout as already described in the case of Fig. 3a, etc. These embracing metal jackets 31b can completely surround the inner tubing as in the case of Fig. 3a, but in this case I preferably only so jacket the tubing around the more exposed portion of its circumference, leaving the remaining portion not requiring such protection in its single thin walled original form for quicker and greater absorption of the combustion heat.

In Fig. 17a is shown how I preferably and novelly form these circumferential jackets of protective metal by combining them with a fin integrally formed and stamped out of a single piece of sheet metal. This sheet metal is folded double to form the fin 31c, while portions of same are slotted out and bent to form the curving protective arms 31b which are then bent around to clinch on and embrace the individual tubes of the coil 22a, as indicated in Fig. 17, to which they are applied and clinched prior to the brazing bath which molecularly unites them to the tubing walls throughout. In the brazing bath the two opposing faces of the folded fin, 31c, are solidly filled and united with a thin wall of brazing in the slot, 31d, so formed, while the extending arms 31b embracing the coil tubing 22a are similarly brazed to same throughout, so as to make a multi-walled tube for these portions of the coil which it is desired to so especially protect. The metal for these fins and protective jacket extensions can be of copper, or copper alloy, the same as the coil tubing, or they may be of a different metal from the tubing, selected particularly for protective resistance, as for example, special fire resistant iron, steel, steel alloy, or other suitable metal. These fins may be applied to a single coil in any desired number or on any desired spacing. In Fig. 17 is shown one fin on the outer front of each coil directly exposed to the fire, with the long jackets 31b protecting the tubing of coils 22a in its most exposed portions, and on the opposite, or back side of the coil, a second fin. This second fin, because of its less exposed location away from the fire and the more distant and protected position of the tubing in relation to the fire, is provided with much shorter securing arms or jackets 31b, as indicated, so as to maintain the highest conductivity of the thinner tubing in these portions of the coils. Further fins can be attached at other points on the sides of the coils if desired. It should be particularly noted that these novel fin forms serve a threefold purpose. First, as in the case of Fig. 17, they act as rigid spacers which hold the spaced apart turns of the coil firmly in place so as to prevent them sagging and closing together. This is important where it is desired to tilt the coil over the fire as in the case of Fig. 17 and permit the combustion gases to circulate freely up through the coil at all points and completely surround the various turns of the coil. Secondly, the fins serve as a quick heat absorber for distributing and equalizing the heat absorption throughout the several turns and absorbing the shock of the combustion attack, so adding greater efficiency to the heating while at the same time prolonging the life of the metal tube walls. Thirdly, the jacket-formed arms metallically securing the fins in place provide armored multi-walled protection of the tubing, as already described.

Figures 19, 20, 21, 22, 23, 24, 25, 26, 27, 28, 29, 30:
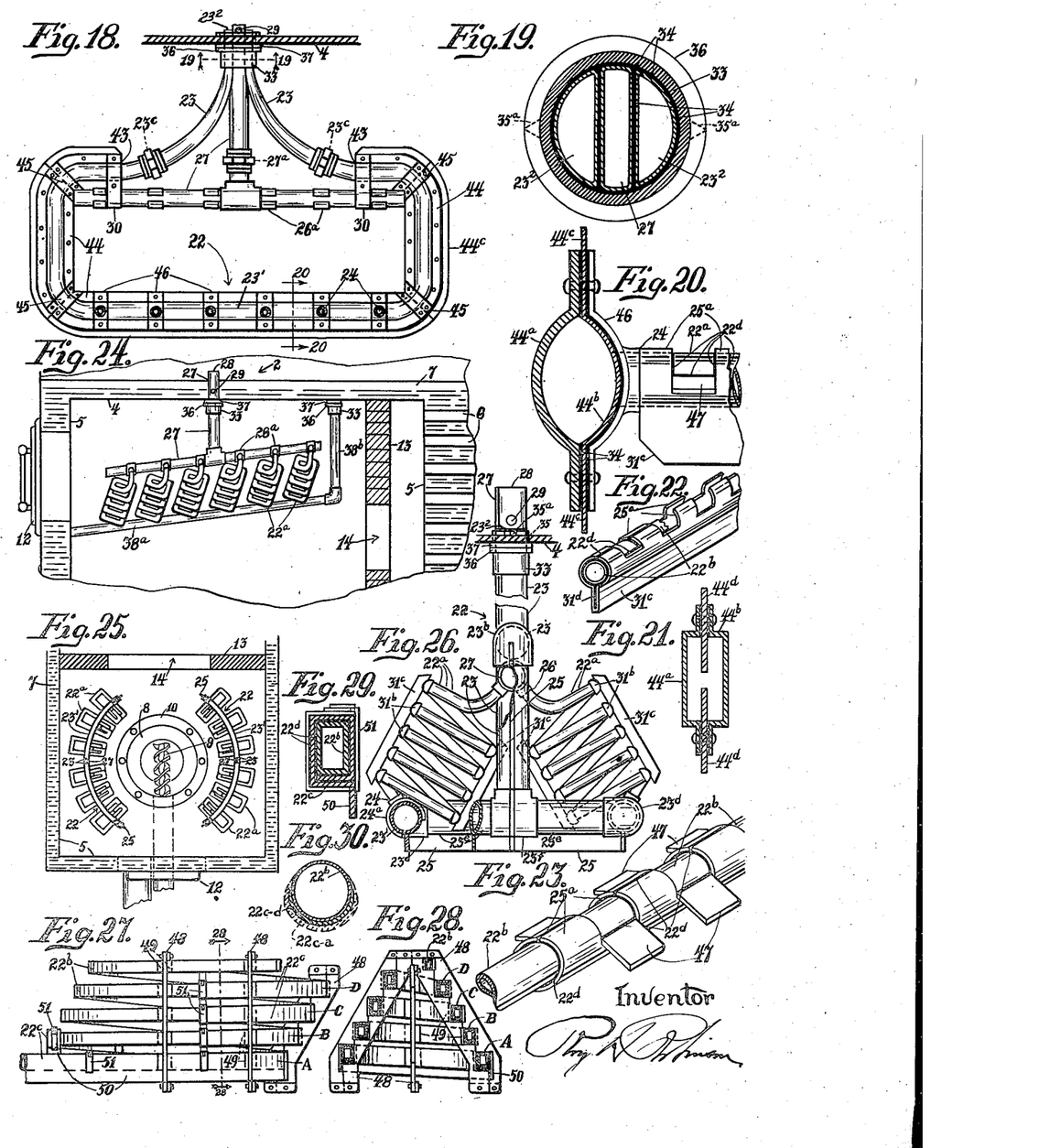
Fig. 19 is a cross section of the tubular frame taken on the line 19—19 of Fig. 18.
Fig. 20 is a fragmentary cross section on the line 20—20 of Fig. 18 indicating construction of the lower tubular frame member of units of the type of Fig. 18 and modified form of coil finning for the battery coil tubing.
Fig. 21 is a cross section, showing a modified form of a tubular frame of the type of Fig. 20.
Fig. 22 is a fragmentary perspective of a modified form of finning and multi-walled construction for tubing of the heating coils or tubular frame members.
Fig. 23 is a fragmentary perspective of another modified form of finning and multi-walled construction for tubing of the heating coils or tubular frame members.
Fig. 24 is a fragmentary longitudinal sectional elevation through the firebox of a boiler, showing a modified form of installing pre-steaming battery units.
Fig. 25 is a fragmentary plan showing a modified form of tubular battery frames in a firebox.
Fig. 26 shows a side elevation of a modified form of a pre-steaming battery unit attached to a crownsheet.
Fig. 27 is a fragmentary side elevation of a modified form of pre-steaming coil with multi-walled and finned tubing protection.
Fig. 28 is a cross section of same taken on the line 28—28 of Fig. 27.
Fig. 29 is a cross section of multi-walled and finned tubing used in the coil of Figs. 27 and 28.
Fig. 30 is a cross section of a modified form of multi-walled tubing for the pre-steaming coils or pre-heating tubular frames of the battery units.

Figs. 18, 19 and 20 show a modified form of the tubular unit 22, wherein the tubular frame 23' is formed largely (or if desired, entirely), out of stamped sheet metal rather than out of more expensive tubing or pipe, thereby cheapening the cost of the frame. In this instance the outlet tube 27 is shown formed as in the previous frames and preferably of copper or copper alloy while the uppermost portions of the intake tubes 23 are also of regularly formed tubing, preferably also of copper or copper alloy, which fit and braze into the remaining stamped and finned sheet metal portion of the frame at 43. The uppermost portions of tubes 23 and 27 are brazed into the welding collar connection 33, as heretofore described, for welding the frame to the crownsheet at its connection into same, but in this instance I show an alternate form of shaping or deforming these tubes and fitting them into their passageway through the collar 33, as better shown in the cross sectional Fig. 19. As will be noted, in this instance, the central tube 27, which in its other portions is normally round, is flattened on its two sides as it approaches and passes into the collar 33 while the two intake tubes 23 are flattened on their sides adjacent to the tube 27 so that the three tubes enter and fill the collar 33 as noted, their outer adjacent surfaces and that of the welding collar 33, being all tightly united by the brazing 34, as heretofore set forth. The tubes 23 are shaped to fit into the flanged or finned sheet metal tubes 44 which they enter at the points 43, and project into a few inches as noted. The joint so formed is interiorly brazed while exteriorly, the strap 30 passing around the tube 27 and riveted to the flanged tube 44 on both sides, as noted, is also brazed to the exterior of the flanged tubes 44 and the outlet tube 27. The flanged tube 44 is formed of flat sheet metal of a gauge adequately heavy to furnish the proper strength, resistance and durability for the purpose for which it is to serve. It is stamped out in sections, in this case, five each for its two opposing sides as noted, and these are butt jointed under two outer embracing stamped metal fish plates 45, which are riveted over and on the abutting joints and subsequently brazed in the general brazing operation to which the whole frame is subjected when finally assembled into a complete unit. This can be done in accordance with my brazing Patent #1,930,285, issued October 10, 1933. The intake holes for the connection of the battery coils 22a, at 24, are stamped into the sheet metal forming the half or side on which these are received and over these holes, and coincident therewith, are riveted, the cross bands receiving connections 46 which can be cast, wrought or forged, but are preferably stamped and drawn of heavy sheet so as to form the receiving housing connection at 24 into which the ends of the coils 22a are slipped prior to brazing. The connections 46 are riveted to the flanged members 44 so as to temporarily hold same and the opposed flanged members 44 together and the several members are all completely, metallically and molecularly united thereafter in the brazing process following the general assemblage. The forming of the unit 22 in this way not only permits a cheap stamping fabrication of parts but also forms the heat absorbing fins 25 of Figs. 3, 4, 5, etc., integral with the preheating tubular frame and produces a very strong and rigid frame for resisting sagging and distortion under weight and heat. Still more important, however, it permits of a varied and novel combination of metals which I make to meet different demands on the unit in its different parts. Thus for example, when it is desired, I make the side of 44 to be exposed nearest the fire, designated 44a in Fig. 20, of tougher metal such as specially suited iron, steel or steel alloy designed to resist shock, corrosion, oxidation and deterioration from more severe contact with the fire and combustion gases to which it is more directly exposed, while on the opposite or back side which is accordingly more protected from this attack, I can use heavy copper sheet or copper alloy sheet for this member 44b, which is a much more efficient heat conductor although somewhat vulnerable to deterioration, if it were subjected to the attack from which, however, it is protected by the tough steel facing 44a. When desired, under this arrangement the back member 44b can have its terminal ends extended outward in a single exposed and unprotected fin edge 44c for greater heat absorption, the ultimate deterioration of this edge not being of vital importance to the life and stability of the tube itself. The several members are all tightly and integrally united by the brazing 34, as noted, the brazing being preferably of metal of high heat conductivity. When this extra protection against deterioration under fire exposure is not required, both sides 44a and 44b of the formed tube 44 can be made of sheet copper or copper alloy or other desirable high heat conductive metal. On the other hand, when still greater protection is desired, both sides 44a and 44b can be stamped from steel, steel alloy or other desirable metal offering high resistance qualities to deterioration under such exposure. The same considerations apply to the selection of metal for the connection straps 46 and also 30, etc., and the splice plates 45 and this also holds for the tubes 23 and 27. The wall gauge of these metals will also be determined by the service desired, it being borne in mind that the thinner gauge presents greater heating efficiency, and the heavier gauge, longer life for the metal. When desired, my coils 22a can also be formed of built-up tubing similar to the tubing 44; and Fig. 20.

In Fig. 21 is shown an alternate construction for the frame 44, the purpose of which is to give still greater heating efficiency. In this instance, the opposing sheet metal side members 44a and 44b have inserted between them the sheet metal strips 44d, of copper or other high heat conducting metal. On the outer edges of the formed tubes these members 44d form a projecting heat absorbing fin while inwardly they project into the water carried through the tube so as to conduct the heat directly into same and give a large heat radiating area directly within the water which it preheats. At the same time, by making the tube quite narrow in one direction and wide in the opposite direction, as indicated, the preheating water is given a large heating contact in relation to its depth, on the containing walls 44a and 44b, thus making a highly efficient preheating tube. In this arrangement also, the walls 44a and 44b can be either steel or copper or the combination of same, but in this instance if they are both steel or less efficient conducting metal, the heat absorbing efficiency of the tube is still maintained to a high degree owing to the insert copper conductors 44d.

In Fig. 22, is shown a modified form of metal fin, similar to that of Fig. 3b, of particular use for attaching to the tubing of the coils 22a and especially their lower or bottom exposed section or turn, as well as tubular frame members such as 23 of Fig. 4, etc. This fin member is stamped out of plain sheet metal and folded after the manner of 31c of Fig. 17a. In this instance the stamped out arms 25a are made to fold and clinch on the tubing 22b longitudinally after the manner of Fig. 3b. The arms 25a in this case, however, in contrast to those of Fig. 3b, are not cut away, down to the fin proper, but only part way, as shown, so as to leave the sheet metal to cover the bottom and lower sides of the tubing 22b for an extra protective wall. After this fin member is clinched on to the tube member 22b it is metallically united to the tube at 22d in the brazing bath so that the tube becomes a multi-walled and finned tube with single wall exposed portions in more protected spots for the quicker absorption of heat at such points. In the case of coiled tubular forms the fin is preferably brazed on the tube before coiling, the tube thereafter being formed to its own intended curvatures. In Fig. 20, a fin of this type is shown attached to the tubing 22a, but the fin member in that case has still a further improvement in having extended winged fin 47 bent out between the arms 25a to form protective and heat absorbing side fins on both sides of the tube instead of this metal being cut away in stamping the sheet, as in the case of Fig. 22.

In Fig. 23, is shown still another modified form of protective jacket and finning for the coil or other heat absorbing tubing. This, also, is stamped from flat sheet metal and is clinched around the tubes by means of the stamped out arms 25a, the opposing walls of the tube jacket being then brazed together throughout in the brazing bath, to form a solid metal integral wall throughout same, as in the case of Fig. 22, etc. The side fins 47 are bent outward, the same as in Fig. 20, but in this instance the bottom fin is omitted. The tube 22b is thus given a multi-walled structure united throughout by the brazing 22d, while the side fins 47 are heat absorbing elements as well as protecting the single walled portions of 22b, exposed for rapid heat absorption above same. As in the case of Figs. 3a, 3b, 17 and 17a, 20 and 22, the metal of the jacket or finned protective element may be the same as, or different from that of the tube to which it is metallically united, thus permitting a novel and varied combination of physical properties most suited to the situation as already previously dwelt on.

In Fig. 24, is shown another modified form of carrying my quick heating and pre-steaming coil batteries in the firebox. In this instance the coils 22a are connected to and supported on a tube 38a, somewhat similar to their corresponding arrangements with tube 38 in Fig. 11. Here, however, the tube 38a, while connecting with the water jacket through the lining 5, to which it is attached at its front end, does not connect into a supporting transverse header tube, as 39 in Fig. 11, but instead continues on upward as tube 38b, to connect through and join with the crownsheet 4 through my special overhead welding collar connection 33, brazed or otherwise metallically joined to 38b and welded to the overhead crownsheet 4, at 37, on the offset rim 36. This permits the feeding and circulation of the hot water from the uppermost portion of the water chamber to the coils as distinct from the arrangement of Fig. 11. After the water fed from the tube 38a is further heated in the coils 22a, it passes as water or steam, as the case may be, into the manifold tubular receiving tube 27, to which the coils are connected as noted, and passes into the upper portion of the water jacket through the opening 29, in the case of hot water, or directly into the steam chamber 2, through the vent 28 when steam is generated. The tube 27 is similarly provided with my welding frame collar connection 33 into which it is brazed for welded connection with the crownsheet 4, as already described.

In Fig. 25, is shown by somewhat diagrammatic plan, a modified form of my tubular battery frame for use in small heating plants for domestic purposes and the like, generally provided with a small firebox with a round stoker firepot therein, as indicated. For this purpose I provide the framed units 22 with curving instead of straight supporting frames of the type of Figs. 4, 5, 6, 7, etc. In this way the batteries may be hung on both sides of the round firepot with the coils uniformly spaced in relation thereto so as to absorb a maximum amount of heat while being close to the fire core and spaced away from the chilling water jacket. These curved frames can be used to advantage in various similar or other varied combinations in large fireboxes as well and so have a great variety of application in carrying out the many possibilities of my invention.

In Fig. 26, is shown a further modified form of one of my battery frame units 22 in which the coils 22a are carried in a double row on the tubular frame 23'. The frame in this case is similar to the previous structure with the exception that the tubular member 23 branches at the base at either end to form two spaced apart longitudinal supporting tubes 23d, instead of the single central base supporting tube 23 used in the previous forms. The base is rectangular in shape and it is connected by two vertical tubes to an inverted T-shaped stem connected to the crown sheet after the manner of the typical frames 23'. This frame, supporting two rows of multiple batteries 22 opposite each other, can be suspended from the crownsheet in desired position in the firebox, as in the case of the somewhat similar frame of Fig. 17, but it is particularly suited to suspending directly above the core of the fire corresponding to the setup of Figs. 11 and 12, or the central frame of Fig. 16, the coils in such case being spaced from the fire bed and the main core of the combustion at a sufficient distance so as not to seriously interfere with the proper completion of the combustion in the firebox, while at the same time being as close to same as possible for a maximum absorption of heat. The two longitudinal side tubes 23d which are connected at their ends by the transfer tubes 23e, which in turn connect by T's 23f, or other equivalent means, into the regular vertical side tubes 23, are normally straight tubes in either parallel or converging position, but where it is desired to obtain the benefits of the frame arrangement shown in Fig. 25, as in the case of a small firebox or one with a circular stoker firepot, the two base tubes 23d, can be curved away from each other so as to obtain the same effect in a single frame unit 22 as the two frame units 22 of Fig. 25. This single frame with its curved base can be thus suspended directly above the firepot 8. Still further, if desired, the tubes 23e may be omitted and the tubes 23d can be curved to form a circular supporting base to connect directly into the two end T's 23f. It will be understood that in all of these curved tubular bases the equivalent of same is obtainable by assembling short lengths of straight tubing with angled connections so as to form a polygonal base equivalent to the curvilineal base and in referring to the curved base tubes, either circular, oval, or the like, the term is intended to embrace, as well, a polygonal tubular base serving substantially the same purpose. Either one or the other form may be used to best suit the fabrication facilities, costs, etc.

In Figs. 27 and 28, is shown a modified form of coil having the long and narrow proportion, particularly preferred in my coil design, but having the sides stepped or sloped inwardly so that when suspended above the fire or rising combustion gases, the respective turns are not baffled from beneath but, on the contrary, each individual turn is more completely exposed to the ascending burning gases and the projected heat waves. In this case, as noted, the coils are shown with cross fins 48, which fin the coils both inside and out, and such finning can be applied to any of my coils. They are preferably stamped from sheet metal in halves as indicated with out-turned feet 49. The opposing halves of these fins so formed are placed at the desired points opposite each other on the inside and outside of the coil and their ends riveted, clipped, or interlocked together so as to firmly grip the several turns of the tubing with the extending feet 49 fitting against the tubes on both sides and becoming brazed to same at these contacting points in the brazing bath to which the coil when assembled is subjected. The bottom turn of the coil, as indicated, or any or all of the respective turns may be further protected by my special fins disposed longitudinally of the tubing in the form indicated in Fig. 29, or in any of the forms already noted or equivalents of same, for absorbing and distributing additional heat as well as protecting the tubing, as heretofore described.

The tubing of the coil also may be multi-walled throughout for special protection and longer life when so desired, or, as indicated in Figs. 27 and 28, only portions of each turn may be so constructed for specific protection of the exposed parts overhanging or tilting over the fire and more severely exposed to the more direct fire attack. In the coil of Fig. 27, the right hand end of the coil, being so exposed in the firebox, has those portions of each turn and likewise the length of the bottom turn so armored with multi-walled construction, as noted. As a particular feature of this multi-walled construction, in this case the thickness of the wall protection is varied for different turns of the coil in relation to their distance from the fire or their particular exposure to fire attack. Thus the gauge of the metal forming the outer wall or jacket for the tubing of the lowest turn A, so protected, is of heavier gauge than that of B, that of B heavier than that of C, and that of C heavier than that of D, etc. The multi-wall 22c is formed and metallically united to the tubing 22b, in this case, in the manner shown in Fig. 29, but this can be done after the manner of Fig. 3a, or the various modified forms of Figs. 17 and 17a, Figs. 22, 23, etc., and the tubes can be completely covered circumferentially or only partly protected and on their directly exposed faces along the lengths of these armored sections, the modified forms permitting the selection of any such degree of protection desired. It should be understood, however, that in all cases the outer wall 22c may be formed on the inner wall 22b either as a separate tube section pulled over same as in Fig. 3a, or a sheet wrapping about same after the manner of Fig. 29, or even a diagonal strip winding can be employed, the brazing bath in all cases uniting the contacting or adjacent metallic surfaces into a molecularly joined unit throughout.

In Fig. 29, the multi-walled construction, whether extending the entire length of the tubing or only over selected portions, is formed by wrapping the tubing 22b with sheet metal 22c and brazing the contacting surfaces in any desired way but preferably in accordance with my brazing process set forth in my beforementioned Patent No. 1,930,285, issued October 10, 1933. It will be noted in this instance that the exterior metal wrapping 22c is so arranged as to preferably lap on the bottom of the tube where the fire attack is most severe so as to give a doubled protection at this point. This particular arrangement for this purpose can be located on any side of the tube which receives the brunt of the fire attack. Also by extending the sheet metal wrapping 22c outward at its edge, a heat absorbing, distributing and protective metal fin 50 is formed integral with the tube structure. This can be provided on the bottom turn of the coil, as indicated in Figs. 27 and 28, or it may be provided on each of the turns B, C and D as well as A. The sheet metal wrapping 22c is held in position by the metal tie bands 51, which clinch around the tubing, after it has been wrapped in place, at suitable spaced apart intervals and become brazed integrally therewith in the brazing process. The tubing 22b may be rectangularly shaped as indicated in Figs. 27, 28 and 29, for particular quick heating advantages, or may be round or any other desired shape, while the wrapping sheet 22c for same may be of the same metal as the tube, as for example copper, or for greater protection when so wanted, the sheet metal may be of iron, steel, or special alloys giving a maximum protection and metal longevity against the fire attack.

In Fig. 30, a modified form of the multi-walled protection of my heating coils is indicated. In this case the severely exposed portions of the tubing 22b of the coils are metallized by spraying on to these portions, while molten, a metal having high protective properties for resisting the fire attack, etc. In this way a copper tube 22b can be armored at the desired points with an integrally united exterior wall of iron, steel, or alloy, on the particularly exposed portion while the remaining portion is left with the copper exposed for maximum heat conductivity. In view of this combination of thicknesses and metals, a lighter walled tube can be used throughout giving thereby an increased heating efficiency on those areas which do not need to be protected. Also the sprayed metal when desired can be of copper or the same as the tubing for maximum heat absorption, the protection in such case being in the extra thickness of wall metal at these points of particular attack.

In utilizing this novel multi-walled construction of the coil of Figs. 27 and 28, the lower turn A is preferably given a maximum of metal thickness, indicated by the dotted line 22c—a of Fig. 30, while the multi-wall protected portion of the upper turn D is given a thinner wall protection 22c—d. The intermediate protected turns B and C, are given correspondingly intermediate thicknesses respectively so that the protective metal is suitably graduated from the thickest to the thinnest layer in relation to its position, and this protective metal can be disposed on the most exposed faces. The tubing can be so metallically built up after being coiled when the portions to be so treated are suitably accessible, but in other cases the tubing can be so built up at predetermined points while in the straight and subsequently coiled, shaped, or fabricated.

In conclusion, it will be understood that the shape, materials, arrangement, location, and connections of my preheating or pre-steaming units may be varied at will, as desired, to meet conditions, and for either a steam or hot water plant, and for boilers of whatever design and construction; also that while one of the particular features of my invention is to facilitate the pre-steaming of a boiler without raising the main body of water of its water compartment to the steaming point, my quick heating battery units are equally serviceable in hot water systems where they serve to more quickly heat the water for circulation through the circulating heating system.

While I have shown and described my invention in preferred form, I am aware that various changes and modifications may be made therein without departing from the principles and spirit of my invention and I reserve the right to make all such variations as fairly fall within the scope of the following claims.

I claim as my invention:

1. In combination in a heating plant having a firebox with a crown-sheet and a water jacket, at least one stirrup-like tubular frame suspended from said crownsheet and operatively connected with said water jacket and a battery of spaced apart tubular heating elements supported on said frame and operatively connected with said frame and water jacket.

2. In combination in a heating plant having a firebox with a water jacket and a stoker with a firepot substantially spaced away from the sides of the water jacket, a plurality of batteries of tubular heating and circulating elements disposed substantially above but otherwise adjacent and extending substantially along at least three sides of said firepot and operatively connected with said water jacket through header like portions.

3. In combination with a tubular water preheating frame having a single connection for attachment and operative entrance to the water jacket of the firebox of a heating plant, a plurality of coils mounted on said frame and serving to circulate water from said pre-heating frame to and through said single connection.

4. In combination with a tubular water preheating frame having at least one connection suitable for attachment and entrance to the water jacket of a firebox of a heating plant and interiorly divided for both receiving and returning water through said connection, a plurality of water circulating elements mounted on said frame and serving to circulate water from said tubular frame to and through said connection.

5. In combination with a heating plant having a combustion chamber and a water and steam chamber, a battery of tubular water circulating and heating elements having a common connection with said water and steam chamber including a tubular extension arranged to project above the water level therein and discharge steam above said water and having an opening below said water level for circulating water when steam is not being discharged.

6. In combination in a heating plant having a combustion chamber and a water jacket, at least one tubular frame operatively connected to the water jacket, said frame having a battery of tubular water circulating and heating coils operatively connected to said frame, including coils shaped long and relatively narrow in plan and having their respective longitudinal axes disposed diagonally to the longitudinal axis of said frame and their respective upright axes inclined from the vertical.

7. In combination in a heating plant having a combustion chamber and a water jacket, header like portions arranged in the combustion chamber and connected to and communicating with said water jacket, a battery of tubular water circulating and heating coils operatively connected to said header portions including coils so disposed that the upright planes cutting their longitudinal and transverse axes, respectively, are both inclined from the vertical when the coils are positioned in said combustion chamber.

8. In combination in a heating plant having a firebox with a water jacket and a stoker with a firepot, a plurality of batteries of tubular heating and circulating elements disposed substantially above but otherwise adjacent and extending substantially along at least three sides of said firepot and operatively connected with said water jacket through header like portions and means for controlling and varying the path of the combustion gases within said firebox in relation to said batteries.

ROY H. ROBINSON.

REFERENCES CITED

The following references are of record in the file of this patent:

UNITED STATES PATENTS

| Number | Name | Date |
| --- | --- | --- |
| 628,344 | Millar | July 4, 1899 |
| 743,825 | Burger et al. | Nov. 10, 1903 |
| 1,103,630 | Stewart | July 14, 1914 |
| 1,178,704 | Berry | Apr. 11, 1916 |
| 1,288,480 | Benjamin | Dec. 24, 1918 |
| 1,311,702 | Mathis | July 29, 1919 |
| 1,357,493 | Foster | Nov. 2, 1920 |
| 1,359,916 | Primrose | Nov. 23, 1920 |
| 1,466,278 | Forward | Aug. 28, 1923 |
| 1,554,546 | Austin | Sept. 22, 1925 |
| 1,577,838 | MacLean | Mar. 23, 1926 |
| 1,701,256 | Brown | Feb. 5, 1929 |
| 1,756,387 | Ronk | Apr. 29, 1930 |
| 1,838,105 | Murray | Dec. 29, 1931 |
| 1,843,790 | Snow et al. | Feb. 2, 1932 |
| 1,991,904 | Martin, Jr. | Feb. 19, 1935 |
| 1,996,105 | Gates | Apr. 2, 1935 |
| 2,016,276 | Crosiar | Oct. 8, 1935 |
| 2,029,437 | Murray | Feb. 4, 1936 |
| 2,167,285 | Smith | July 25, 1939 |
| 2,182,552 | Elsby | Dec. 5, 1939 |
| 2,224,346 | Hobrock | Dec. 10, 1940 |
| 2,291,921 | Robinson | Aug. 4, 1942 |